United States Patent
Heath et al.

(10) Patent No.: US 11,391,904 B2
(45) Date of Patent: Jul. 19, 2022

(54) TEMPERATURE STABILIZED HOLOGRAPHIC SIGHT

(71) Applicant: EOTECH, LLC, Ann Arbor, MI (US)

(72) Inventors: Anthony Heath, Ypsilanti, MI (US); Deanna Kay McMillen, Ann Arbor, MI (US); Steven Kent Brown, Austin, TX (US); John Coleman Horton, IV, Austin, TX (US)

(73) Assignee: EOTech, LLC, Plymouth, MI (US)

( * ) Notice: Subject to any disclaimer, the term of this patent is extended or adjusted under 35 U.S.C. 154(b) by 46 days.

(21) Appl. No.: 16/691,192

(22) Filed: Nov. 21, 2019

(65) Prior Publication Data

US 2021/0157086 A1    May 27, 2021

(51) Int. Cl.
G02B 7/00 (2021.01)
G02B 5/32 (2006.01)
G03H 1/22 (2006.01)
G03H 1/00 (2006.01)
F41G 3/08 (2006.01)

(52) U.S. Cl.
CPC .............. *G02B 7/008* (2013.01); *F41G 3/08* (2013.01); *G02B 5/32* (2013.01); *G03H 1/0005* (2013.01); *G03H 1/2202* (2013.01)

(58) Field of Classification Search
None
See application file for complete search history.

(56) References Cited

U.S. PATENT DOCUMENTS 3,994,597 A    11/1976   Calder et al.
4,191,471 A     3/1980   Courten
(Continued)

FOREIGN PATENT DOCUMENTS

EP    2943736 B1    10/2017
ES    2672007 T3     6/2018
(Continued)

OTHER PUBLICATIONS

International Search Report for Application No. PCT/US2020/060714, dated Jun. 22, 2021; 2 pp.
(Continued)

*Primary Examiner* — Jennifer D. Carruth
(74) *Attorney, Agent, or Firm* — Bodman PLC

(57) ABSTRACT

A holographic sight comprises a unitary optical component carrier having a plurality of receptacles for receiving optical components. A collimating optic abuts a surface of a first receptacle. A mirror abuts a surface of a second receptacle. A collar is positioned in a third receptacle and a laser diode is positioned within the collar. A first portion of the collar is affixed relative to a first portion of the third receptacle and a second portion of the collar is free to expand and contract relative to the third receptacle. The laser diode is affixed to the collar proximate the second portion and is free to move relative to the third receptacle with expansion and contraction of the second portion. The laser diode, the mirror, and the collimating optic are positioned relative to each other to create an optical path. The collar expands and contracts in response to changes in temperature to compensate for the unitary optical component carrier expanding and contracting in response to changes in temperature.

20 Claims, 14 Drawing Sheets

(56) References Cited

U.S. PATENT DOCUMENTS

| | | | |
|---|---|---|---|
| 4,592,654 A | 6/1986 | Girault |
| 4,940,324 A | 7/1990 | Nichols |
| 5,090,805 A | 2/1992 | Stawarz |
| 5,134,798 A | 8/1992 | Lee |
| 5,369,888 A | 12/1994 | Kay et al. |
| 5,383,278 A | 1/1995 | Kay |
| 5,483,362 A | 1/1996 | Tai et al. |
| 5,508,843 A | 4/1996 | Tomita |
| 6,000,667 A | 12/1999 | Isbell et al. |
| 6,490,060 B1 | 12/2002 | Tai et al. |
| 7,145,703 B2 | 12/2006 | Sieczka et al. |
| 7,225,578 B2 | 6/2007 | Tai |
| 7,784,192 B2 | 8/2010 | Jancic |
| 7,872,747 B2 | 1/2011 | Gerlach |
| 8,056,245 B2 | 11/2011 | Cranton |
| 8,087,196 B2 | 1/2012 | Jung et al. |
| 8,156,679 B1 | 4/2012 | Swan |
| 8,186,093 B1 | 5/2012 | Chung |
| 8,240,075 B1 | 8/2012 | Mullin |
| 8,296,991 B1 | 10/2012 | Chung |
| 8,671,611 B2 | 3/2014 | Ostergren et al. |
| 9,057,584 B2 | 6/2015 | Chung |
| 9,500,442 B2 | 11/2016 | Collin et al. |
| 10,095,089 B2 | 10/2018 | Chiao |
| 10,247,515 B2 | 4/2019 | Collin |
| 10,254,532 B2 | 4/2019 | Collin |
| 10,267,597 B2 | 4/2019 | Olmstead et al. |
| 10,345,077 B1 | 7/2019 | Loebig |
| 10,345,587 B1 | 7/2019 | Loebig |
| 10,591,249 B2 | 3/2020 | Campbell |
| 10,704,862 B2 | 7/2020 | Chung |
| 10,801,813 B2 | 10/2020 | Moseman et al. |
| 2003/0074824 A1 | 4/2003 | Arachequesne |
| 2006/0265930 A1 | 11/2006 | Woodbury |
| 2008/0020355 A1 | 1/2008 | Young |
| 2008/0216379 A1 | 9/2008 | Javorsky |
| 2009/0116231 A1 | 5/2009 | Miller |
| 2009/0193705 A1 | 8/2009 | LoRocco |
| 2010/0162611 A1 | 7/2010 | Samson et al. |
| 2011/0228366 A1 | 9/2011 | Liu |
| 2013/0008072 A1 | 1/2013 | Chung |
| 2014/0237884 A1 | 8/2014 | Koesler |
| 2014/0305022 A1 | 10/2014 | Chung |
| 2014/0317988 A1 | 10/2014 | Battis et al. |
| 2015/0198415 A1 | 7/2015 | Campean |
| 2015/0267997 A1 | 9/2015 | Collin et al. |
| 2016/0003996 A1 | 1/2016 | Dehmlow et al. |
| 2016/0033232 A1 | 2/2016 | Cheng et al. |
| 2016/0102943 A1 | 4/2016 | Teetzel et al. |
| 2016/0161735 A1 | 6/2016 | Ambruster |
| 2016/0313089 A1 | 10/2016 | Collin et al. |
| 2016/0327365 A1 | 11/2016 | Collin et al. |
| 2016/0377377 A1 | 12/2016 | Collin |
| 2016/0377378 A1* | 12/2016 | Collin ................... F41G 1/30 42/113 |
| 2017/0205194 A1 | 7/2017 | Teetzel et al. |
| 2018/0292168 A1 | 10/2018 | Borrico |
| 2019/0072702 A1 | 3/2019 | Voloschenko et al. |
| 2019/0145733 A1 | 5/2019 | Chung |
| 2019/0277600 A1 | 9/2019 | Larsson |
| 2019/0346235 A1 | 11/2019 | Sidelkovsky |
| 2020/0011640 A1 | 1/2020 | Moseman et al. |
| 2020/0141700 A1 | 5/2020 | Moseman et al. |
| 2020/0240748 A1 | 7/2020 | Connolly |
| 2020/0272044 A1 | 8/2020 | Walker |
| 2021/0156645 A1 | 5/2021 | Heath |
| 2021/0156646 A1 | 5/2021 | Schulte |
| 2021/0157086 A1 | 5/2021 | Heath |
| 2021/0157119 A1 | 5/2021 | Heath |
| 2021/0157267 A1 | 5/2021 | Heath |
| 2022/0065583 A1 | 3/2022 | Heath et al. |

FOREIGN PATENT DOCUMENTS

| | | |
|---|---|---|
| JP | 4019995 B2 | 12/2007 |
| JP | 2008090257 A | 4/2008 |
| KR | 101375457 B1 | 3/2014 |
| RU | 2582900 C1 | 4/2016 |
| WO | 1995031740 A1 | 11/1995 |
| WO | 2019068165 A1 | 4/2019 |
| WO | 2020250758 A1 | 12/2020 |
| WO | 2021141669 A1 | 7/2021 |
| WO | 2021141670 A2 | 7/2021 |
| WO | 2021141671 A1 | 7/2021 |

OTHER PUBLICATIONS

International Search Report for Application No. PCT/US2020/060695 dated May 21, 2021; 2pp.

International Search Report for Application No. PCT/US2020/060707 dated Sep. 24, 2021; 2 pp.

International Search Report for Application No. PCT/US2020/060719 dated Aug. 20, 2021; 2 pp.

* cited by examiner

TEMPERATURE STABILIZED HOLOGRAPHIC SIGHT

BACKGROUND

Identifying and focusing on an object located at a distance may be facilitated by use of a sight. A sight may be employed, for example, with small arms such as bows, rifles, shotguns, handguns, mounted machine guns, and grenade launchers, etc., and may assist an operator to locate and maintain focus on a target.

Sights have been developed in many different forms and utilizing various features. For example, sights have been developed that present the operator with a hologram which may assist the operator with locating and focusing on an object.

SUMMARY

Disclosed herein is a temperature stabilized holographic sight. The holographic sight may comprise a unitary optical component carrier having a plurality of receptacles configured to receive optical components. A collimating optic may be positioned in a first receptacle. A mirror may be positioned in a second receptacle. A collar may be positioned in a third receptacle and a laser diode may be positioned within the collar. The mirror may be positioned opposite the laser diode. A first portion of the collar may be affixed relative to a first portion of the third receptacle and a second portion of the collar may be free to move, e.g., expand and contract, relative to the third receptacle. The laser diode may be affixed to the collar proximate the second portion and may be free to move relative to the third receptacle with the expansion and contraction of the second portion. The laser diode, the mirror, and the collimating optic may be positioned relative to each other to create an optical path from the laser diode to the mirror, and from the mirror to the collimating optic. The length of the optical path may remain substantially constant in response to changes in temperature. The collar may expand and contract in response to changes in temperature to compensate for the unitary optical component carrier expanding and contracting in response to changes in temperature. For example, the unitary optical component carrier may expand in response to an increase in temperature, causing the first receptacle to move away from the mirror. The collar may expand in response to the increase in temperature, causing the second portion of the collar and the laser diode to move toward the mirror. The unitary optical component carrier may contract in response to a decrease in temperature, causing the first receptacle toward the mirror. The collar may contract in response to a decrease in temperature, causing the second portion of the collar and the laser diode to move away from the mirror. The coefficients of thermal expansion of the collar and the unitary optical component carrier may be different and the length of the collar may be sized so that the length of the optical path remains substantially constant during changes in temperature.

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter. Other features are described herein.

BRIEF DESCRIPTION OF THE DRAWINGS

The foregoing summary and the following additional description of the illustrative embodiments may be better understood when read in conjunction with the accompanying exemplary drawings. It is understood that the potential embodiments of the disclosed systems and implementations are not limited to those depicted. Furthermore, like reference numerals in the figures indicate like elements.

DETAILED DESCRIPTION

Figure 1A:
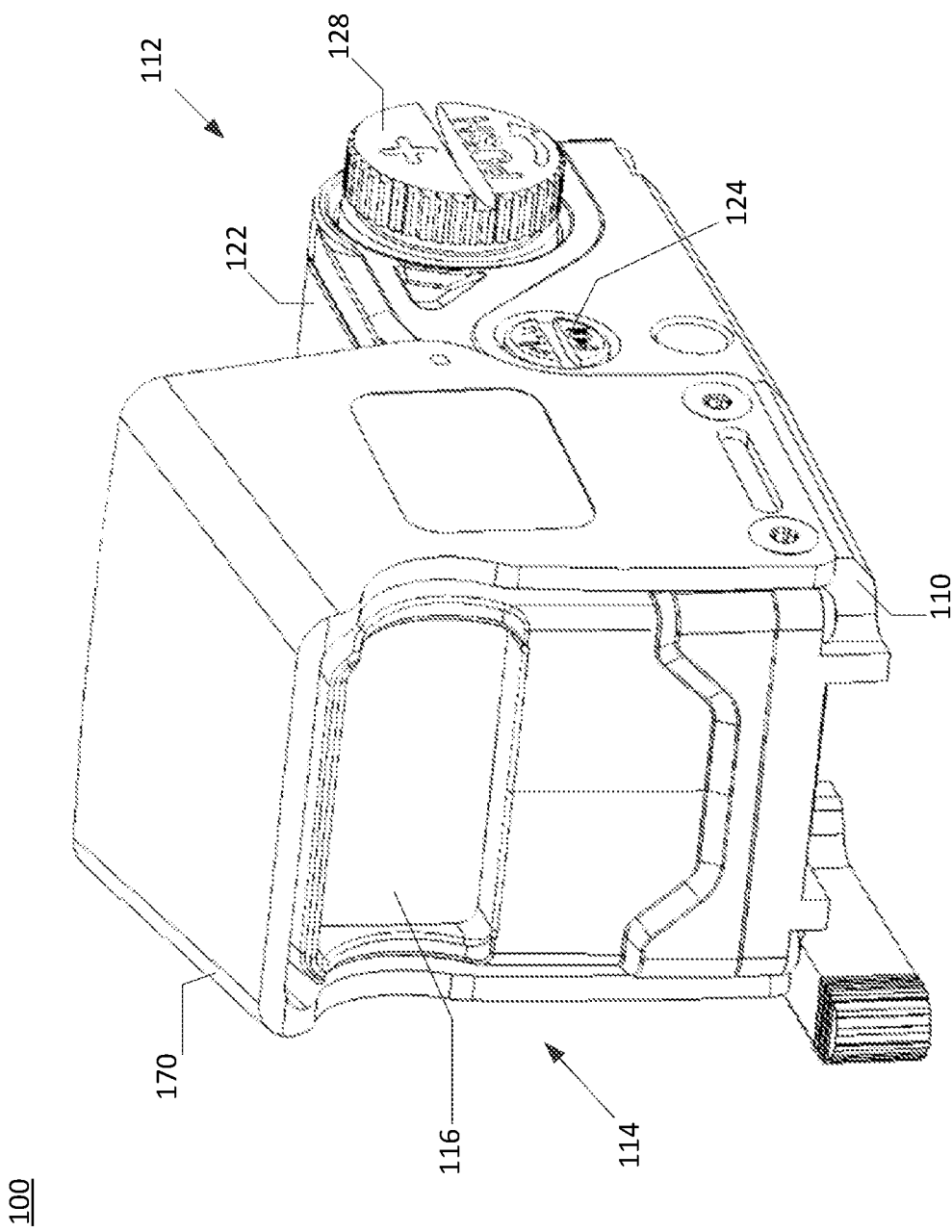
FIGS. 1A, 1B, 1C, and 1D depict perspective views of an example assembled holographic sight.

Holographic sights may employ a series of optical components to generate a hologram for presentation to the operator. For example, a holographic sight may employ a laser diode that generates a light beam, a mirror that deflects the light beam, a collimating optic that receives the deflected light beam and reflects collimated light, a grating that receives the collimated light and reflects light toward an image hologram that has been recorded with an image and which displays the image to the operator of the sight. Operation of the holographic sight requires that the optical components be in the intended positions including distance and orientation relative to each other. Even very small variances from the intended position of even one of the optical components may negatively impact the operation of the sight.

Holographic sights may position optical components relative to each other by affixing them to structures inside the holographic sight. For example, optical components such as, for example, the collimating optic and the hologram image may be affixed to an interior of a holographic sight housing. The mirror may be positioned on a podium extending from a base to which the sight housing is attached. The grating may be affixed to a moveable plate configured to rotate relative to the sight housing. Because the optical components are attached to different components which themselves may be moveable relative to each other, it may be difficult to place the optical components in their intended positions even in a controlled manufacturing environment. Furthermore, movement of any of the structures to which the optical components are attached may move the optical components from their intended positions causing degradation in the reconstruction of the hologram.

Holographic sights may be employed in a wide range of environments and across a wide range of temperatures. The components of a holographic sight may expand and/or contract in response to changes in temperature. For example, in response to a decrease in temperature, the housing and base of a holographic sight may contract or decrease in size. Similarly, in response to an increase in temperature, the housing and base may expand or increase in size. In holographic sights wherein the optical components are affixed to the housing and base, the expansion and contraction of the housing and the base may result in the movement or displacement of the affixed optical components from their intended relative positions. The movement or displacement of the optical components may degrade the quality of the hologram generated by the sight.

Applicant discloses herein a holographic sight that is temperature stabilized. Changes in temperature may not displace the optical components from their intended relative positions and the hologram created by the sight may not be diminished. The holographic sight may comprise a unitary optical component carrier having a collimating optic positioned in a first receptacle, a mirror positioned in a second receptacle, and a collar positioned in a third receptacle with a laser diode positioned within the collar. The mirror may be positioned opposite the laser diode. A first portion of the collar may be affixed relative to a first portion of the third receptacle and a second portion of the collar may be free to move, e.g., expand and contract in length, relative to the third receptacle. The laser diode may be affixed to the collar proximate the second portion and may be free to move relative to the third receptacle with the expansion and contraction of the collar. The collar may expand and contract in response to changes in temperature to compensate for the unitary optical component carrier expanding and contracting in response to changes in temperature. For example, the unitary optical component carrier may expand in response to an increase in temperature, causing the first receptacle to move away from the mirror. The collar may expand in response to the increase in temperature, causing the second portion of the collar and the laser diode to move toward the mirror. The unitary optical component carrier may contract in response to a decrease in temperature, causing the first receptacle toward the mirror. The collar may contract in response to a decrease in temperature, causing the second portion of the collar and the laser diode to move away from the mirror. The coefficients of thermal expansion of the collar and the unitary optical component carrier may be different from each other and the length of the collar may be sized so that the cumulative length of the optical path between optical components remains substantially constant during changes in temperature.

Figure 1B:
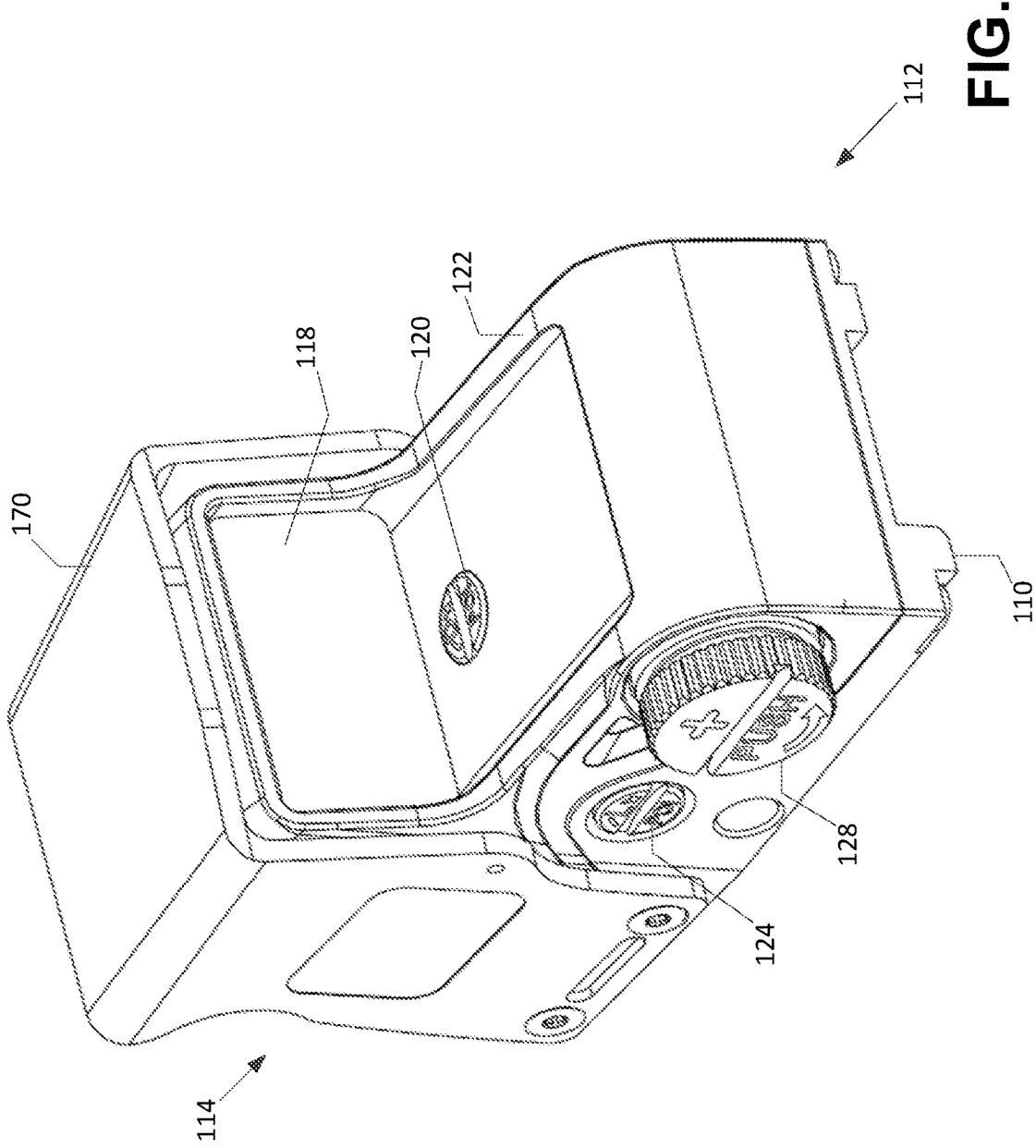
Figure 1C:
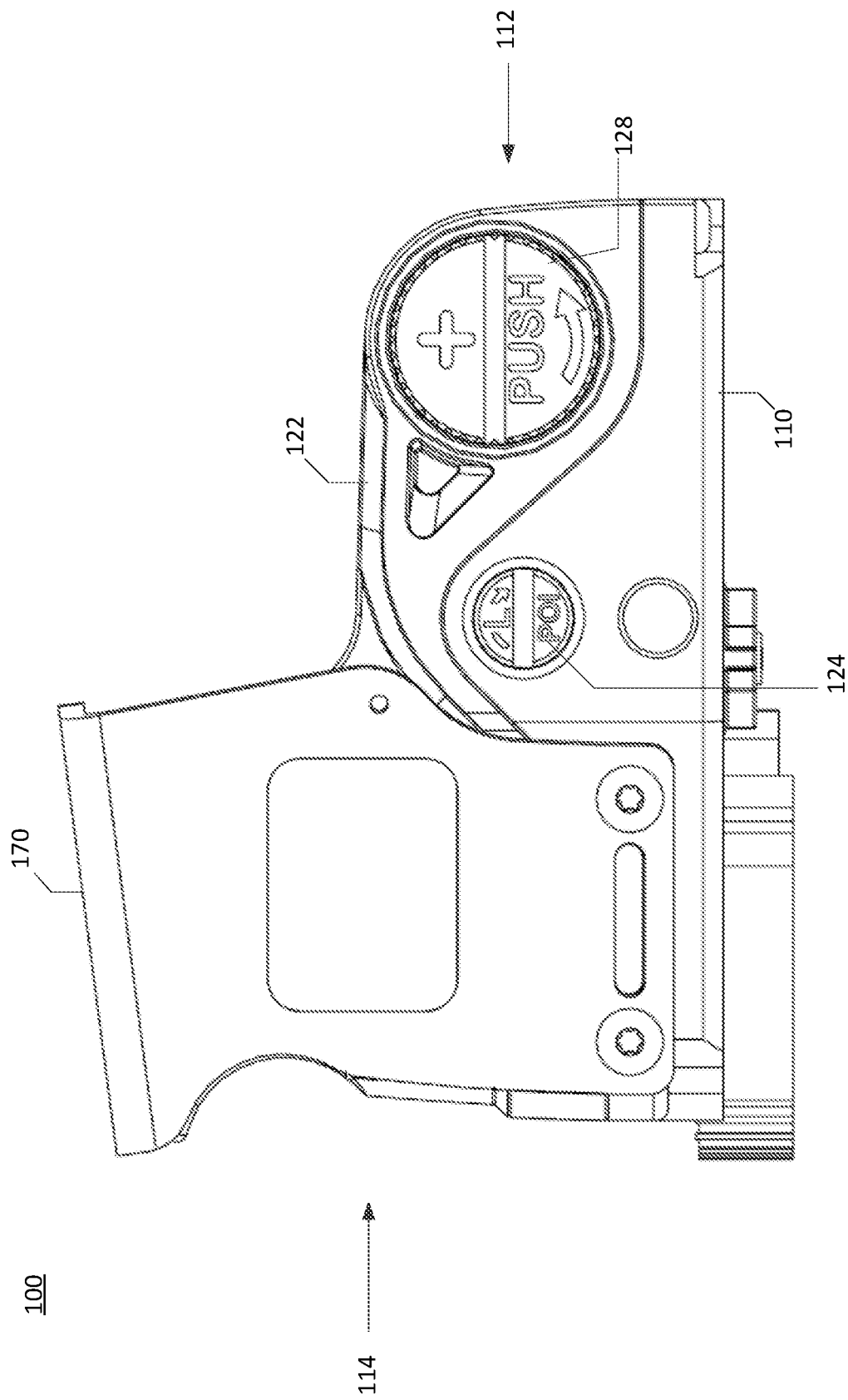
Figure 1D:
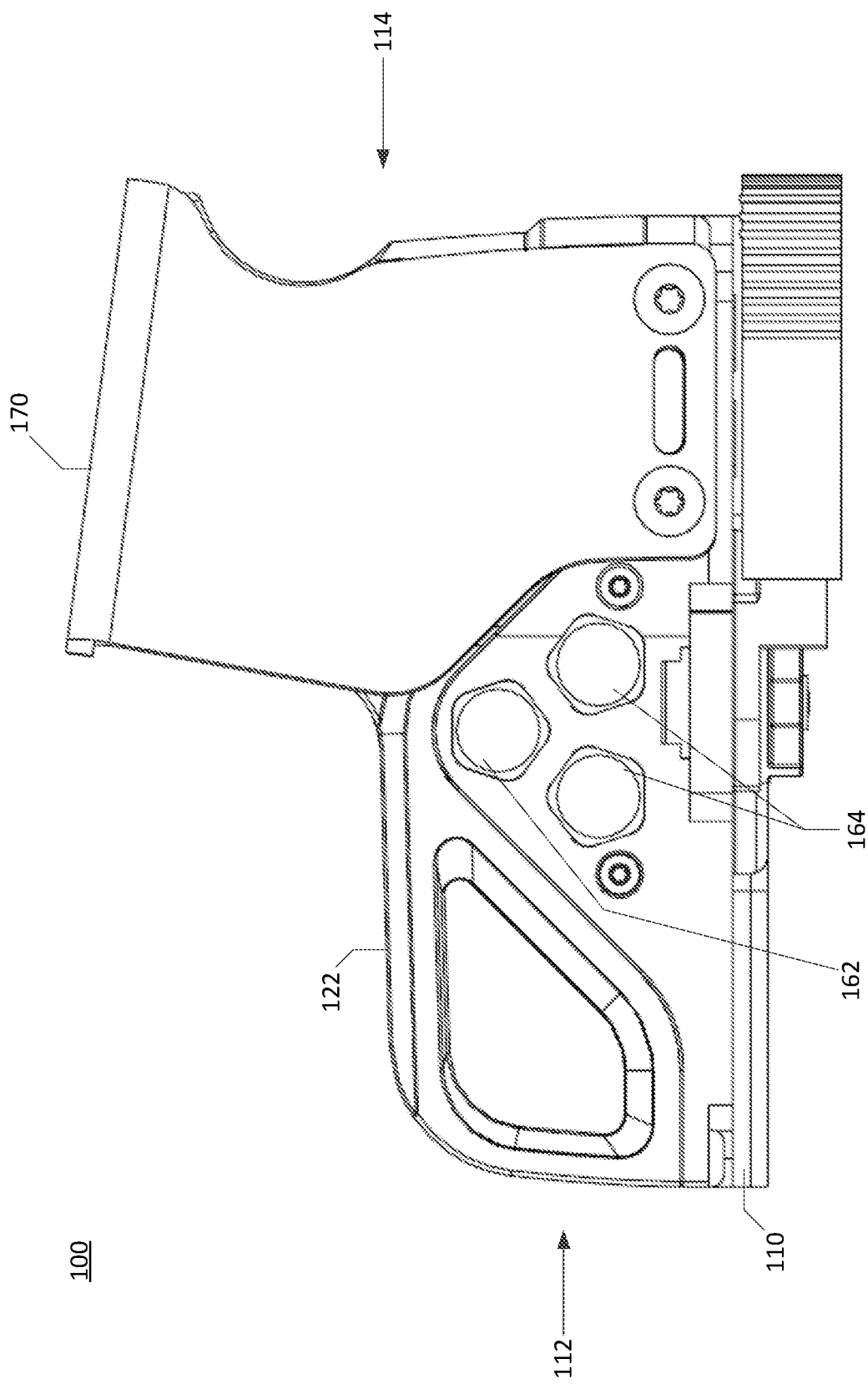

FIGS. 1A and 1B depict front and rear views, respectively, of an example holographic sight 100. FIGS. 1C and 1D depict side views of the example holographic sight 100. The holographic sight 100 may be adapted to be removably attached to a suitable device such as, for example, a firearm. The holographic sight 100 may comprise a base 110 that is configured to releasably engage with corresponding components on a firearm in order to secure the holographic sight 100 to the firearm.

The holographic sight 100 comprises a front end 112 and a rear end 114. An operator of the holographic sight 100 may look through a back window 116 situated at the rear end 114 and an aligned front window 118 situated at the front end 112. The area visible to the operator through the back window 116 and the aligned front window 118 may be referred to as a viewing area. The holographic sight 100 is adapted to impose a holographic image in the viewing area defined by the back window 116 and the front window 118.

An elevation adjustment control 120 may be accessible via an opening formed in a housing 122 of the holographic sight 100. An azimuth adjustment control 124 may be accessible via an opening formed in the base 110. An operator may turn the elevation adjustment control 120 to adjust the vertical location of the hologram as viewed from the back window 116. An operator may turn the azimuth adjustment control 124 to adjust the horizontal location of the hologram as viewed from the back window 116. A battery cap 128 may be removed to provide access to an opening configured to receive a battery which may provide electrical power to the holographic sight 100.

A night vision button 162 and up-down buttons 164 may extend through apertures formed in the base 110. An operator of the holographic sight may depress the night vision button 162 and/or the up-down buttons 164 to change the operating characteristics of the holographic sight 100. For example, depressing a particular button or combination of buttons may cause the holographic sight 100 to change its on/off state, change the brightness of the hologram, and/or toggle between normal and night vision modes The holographic sight 100 may further comprise a hood 170. The hood 170 may be positioned over and around a portion of the housing 122 and may be mechanically attached to the base 110. The hood 170 may be configured to protect the housing 122 from impacts.

Figure 2:
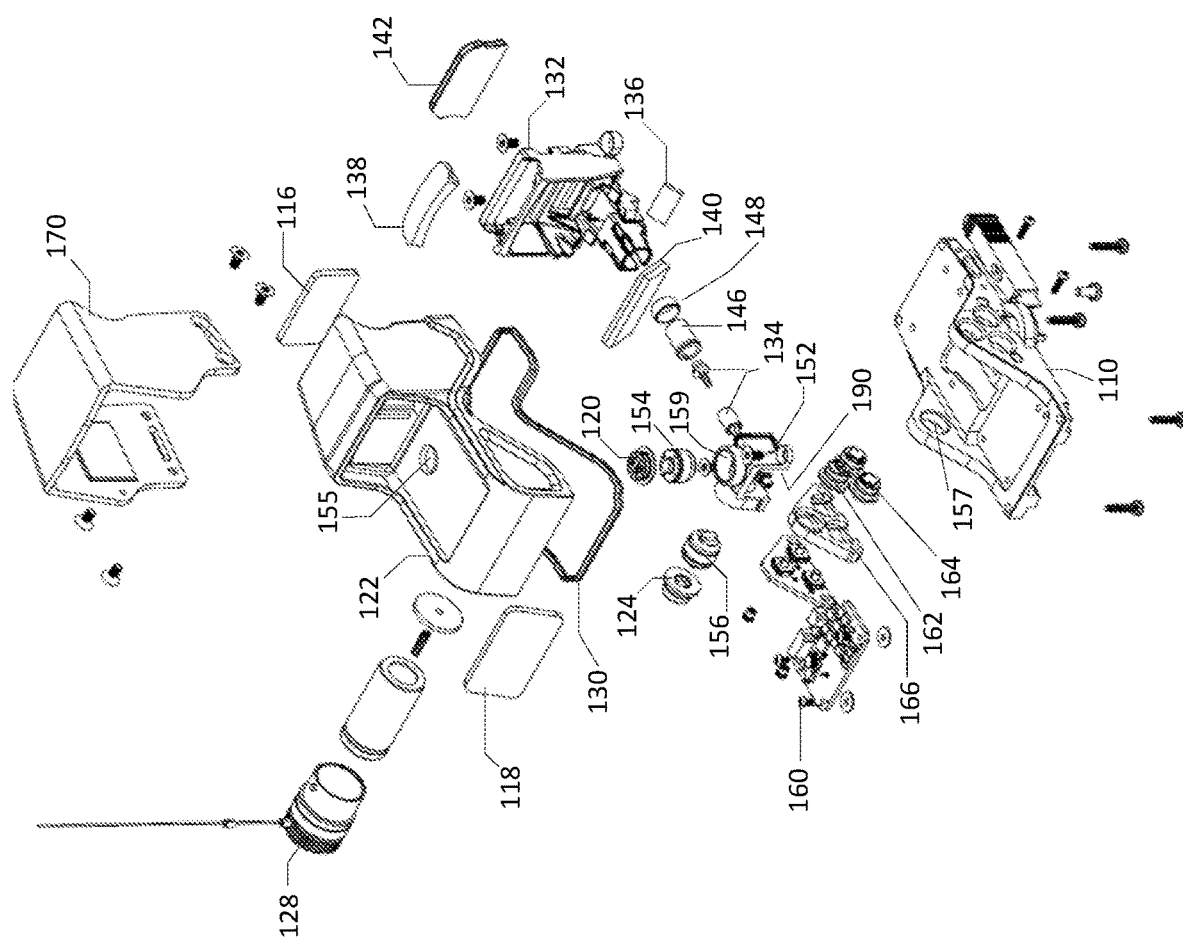
FIG. 2 is an exploded view of an example holographic sight.

FIG. 2 provides an exploded view of the holographic sight 100. The housing 122 may be mechanically coupled to the base 110 and may have a seal 130 positioned therebetween. The housing 122 envelopes components of the holographic sight 100. For example, the housing 122 may envelop an optical chassis 132 which may also be mechanically coupled to the base 110. The optical chassis 132 may comprise a rigid body with a plurality of receptacles for receiving optical components employed to create a holographic image. For example, the optical chassis 132 may comprise a body with receptacles for receiving each of a laser diode 134, a mirror 136, a collimating optic 138, a grating 140, and an image hologram 142. The laser diode 134 may be configured to generate visible light which is directed toward and received at the mirror 136. The mirror 136 may be configured to reflect light received from the laser diode 134 toward the collimating optic 138. The collimating optic 138 may be configured to receive reflected light from the mirror 136 and to direct collimated light to the grating 140. The collimating optic 138 may be, for example, transmissive or reflective. The grating 140, which may be, for example, a diffraction grating, may be configured to receive the collimated light from the collimating optic 138 and to reflect diffracted light toward the image hologram 142. The image hologram 142 may be configured to receive light from the grating 140 and project a hologram image which may be viewed in the viewing area of the holographic sight 100. The holographic sight 100 displays the hologram to the operator who looks through the viewing area presented by the rear window 116. The hologram image may be configured to assist an operator in locating and targeting an object. For example, the hologram may be a reticle, although other images may be employed.

A collar 146, which may be referred to as a diode shoe, may be formed in a cylindrical shape with an interior surface having an associated interior diameter and an exterior surface having an associated exterior diameter. The laser diode 134 may be positioned within the collar 146 and form a frictional fit with the interior surface of the collar 146. A ring 148 may be positioned around the exterior surface of the collar 146 and form a frictional fit with the exterior surface of the collar 146. The ring 148 is received within a corresponding receptacle of the optical chassis 132. The ring may form a frictional fit with opposing walls comprised in the corresponding receptacle of the optical chassis 132. A laser diode hold press may be used to apply pressure to the collar 146 during insertion of the laser diode 134, the collar 146, and the ring 148 into the corresponding receptacle of the optical chassis 132.

The housing 122 further envelopes a bridge 152 which may be mechanically coupled to the base 110. The bridge 152 may form an opening 190 into which at least a portion of the first receptacle of the optical chassis 132 extends. An elevation adjuster assembly 154 and an azimuth adjuster assembly 156 may extend through openings 159 formed in the bridge 152 to engage portions of the first receptacle of the optical chassis 132. The elevation adjustment control 120 may engage with the elevation adjuster assembly 154 via an opening or aperture 155 formed in the housing 122. The opening or aperture 155 in the housing 122 may be formed to allow the elevation adjustment control 120 to engage with elevation adjuster assembly 154 without interference by the housing 122. An operator of the holographic sight 100 may turn the elevation adjustment control 120, which causes the elevation adjuster assembly 154 to increase or decrease the length of the assembly extending into the opening 190 formed by the bridge 152 and thereby increase or decrease a force applied to the first receptacle of the optical chassis 132.

The azimuth adjustment control 124 engages with the azimuth adjuster assembly 156 via an opening 157 formed in the base 110. The opening 157 in the base 110 may be formed to allow the azimuth adjustment control 124 to engage with the azimuth adjuster assembly 156 without interference by the base 110. An operator of the holographic sight 100 may turn the azimuth adjustment control 124, which causes the azimuth adjuster assembly 156 to increase or decrease the length of the assembly extending into the opening 190 formed by the bridge 152 and thereby increase or decrease a force applied to the first receptacle of the optical chassis 132.

The housing 122 may further envelop a printed circuit board assembly 160 comprising electronics configured to power and control the holographic sight 100. A night vision button 162 and up-down buttons 164 may extend through a spacer 166 to engage the printed circuit board assembly 160. The night vision button 162 and the up-down buttons 164 may extend through corresponding openings in the base 110. When an operator of the holographic 100 sight depresses the night vision button 162 and/or the up-down buttons 164, the buttons may interface with the printed circuit board assembly 160 to change the operating characteristics of the holographic sight 100. For example, depressing a particular button or combination of buttons may cause the printed circuit board assembly 160 to change the on/off state, change the brightness of the hologram, and/or toggle between normal and night vision modes.

Figure 3:
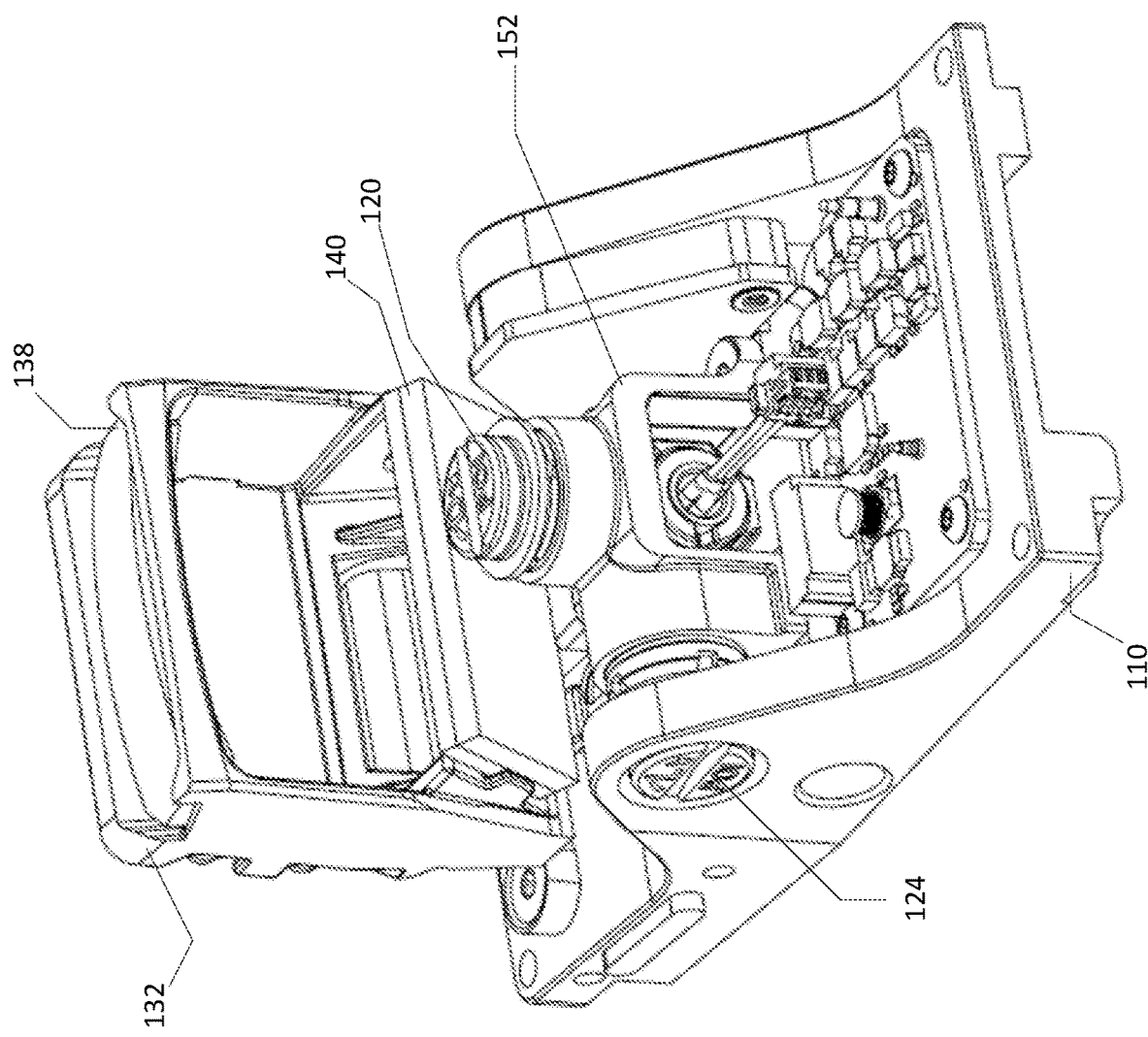
FIG. 3 is a perspective view of a partially assembled example holographic sight.

FIG. 3 depicts a perspective view of the example holographic sight 100 partially assembled with the housing 122, hood 170, and other elements removed. The optical chassis 132 may be mechanically coupled to the base 110 using a suitable fastening technique such as, for example, using screws. The optical components comprising the laser diode 134, the mirror 136, the collimating optic 138, the grating 140, and the image hologram 142 may be received in receptacles of the optical chassis 132. The bridge 152 may be mechanically coupled to the base 110 using a suitable fastening technique such as, for example, using screws. A portion of the optical chassis 132 may extend into an opening 190 defined by the bridge and the base 110. The elevation adjustment control 120 may interface with the elevation adjuster assembly 154 to apply force to a portion of the optical chassis 132 and thereby adjust the elevation of at least a portion of the optical chassis 132. The azimuth adjustment control 124 may interface with the azimuth adjuster assembly 156 to apply force to a portion of the optical chassis 132 and thereby adjust the horizontal orientation of at least a portion of the optical chassis 132.

Figure 4B:
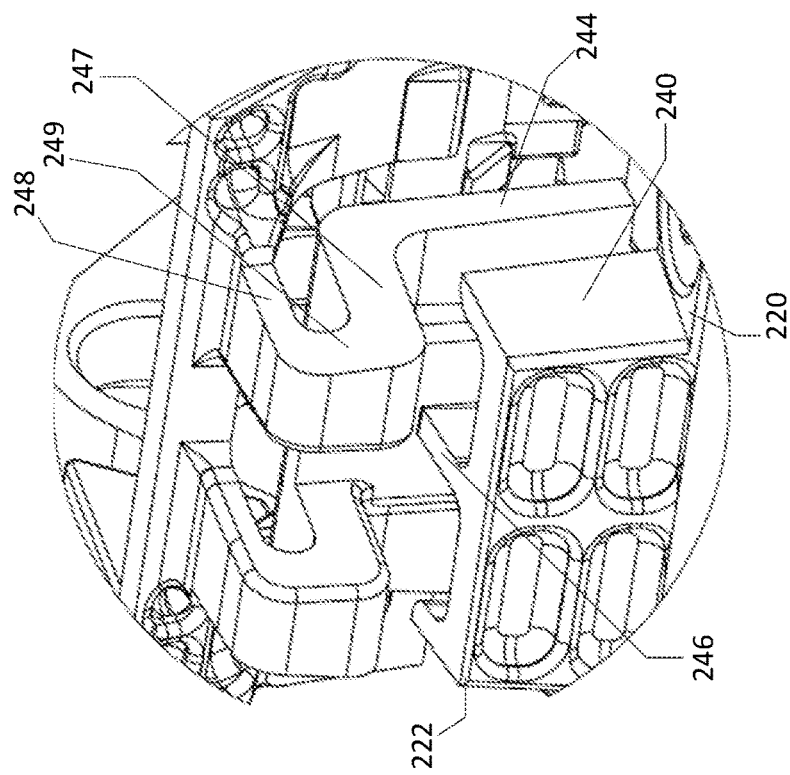
FIG. 4B is a detailed view of a portion of the example optical chassis.
Figure 4A:
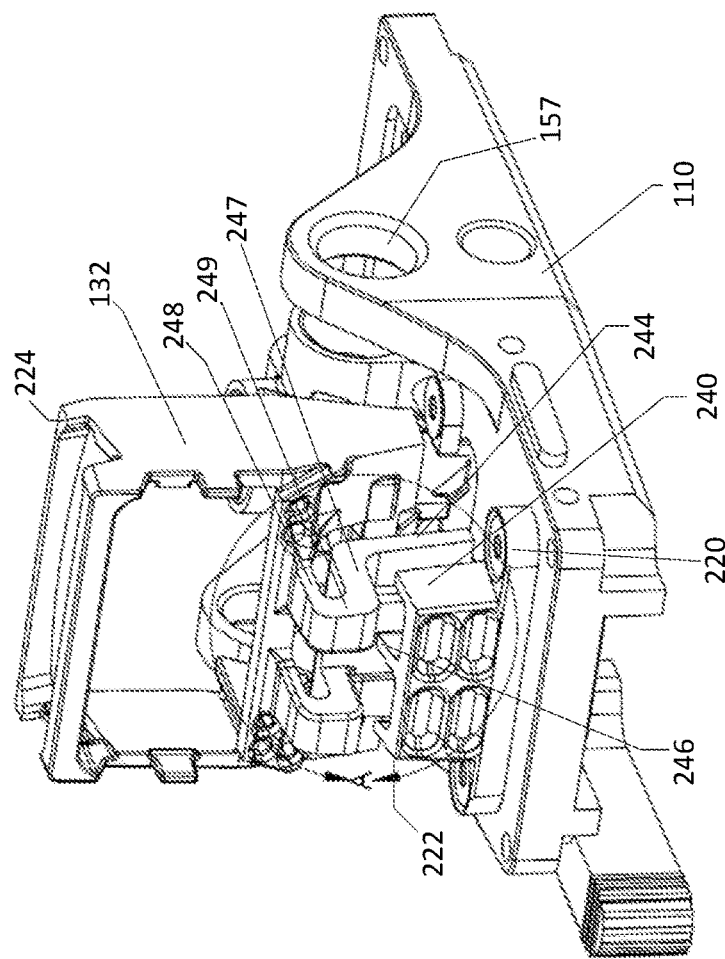
FIG. 4A is a perspective view of an example optical chassis attached to an example base.
Figure 5:
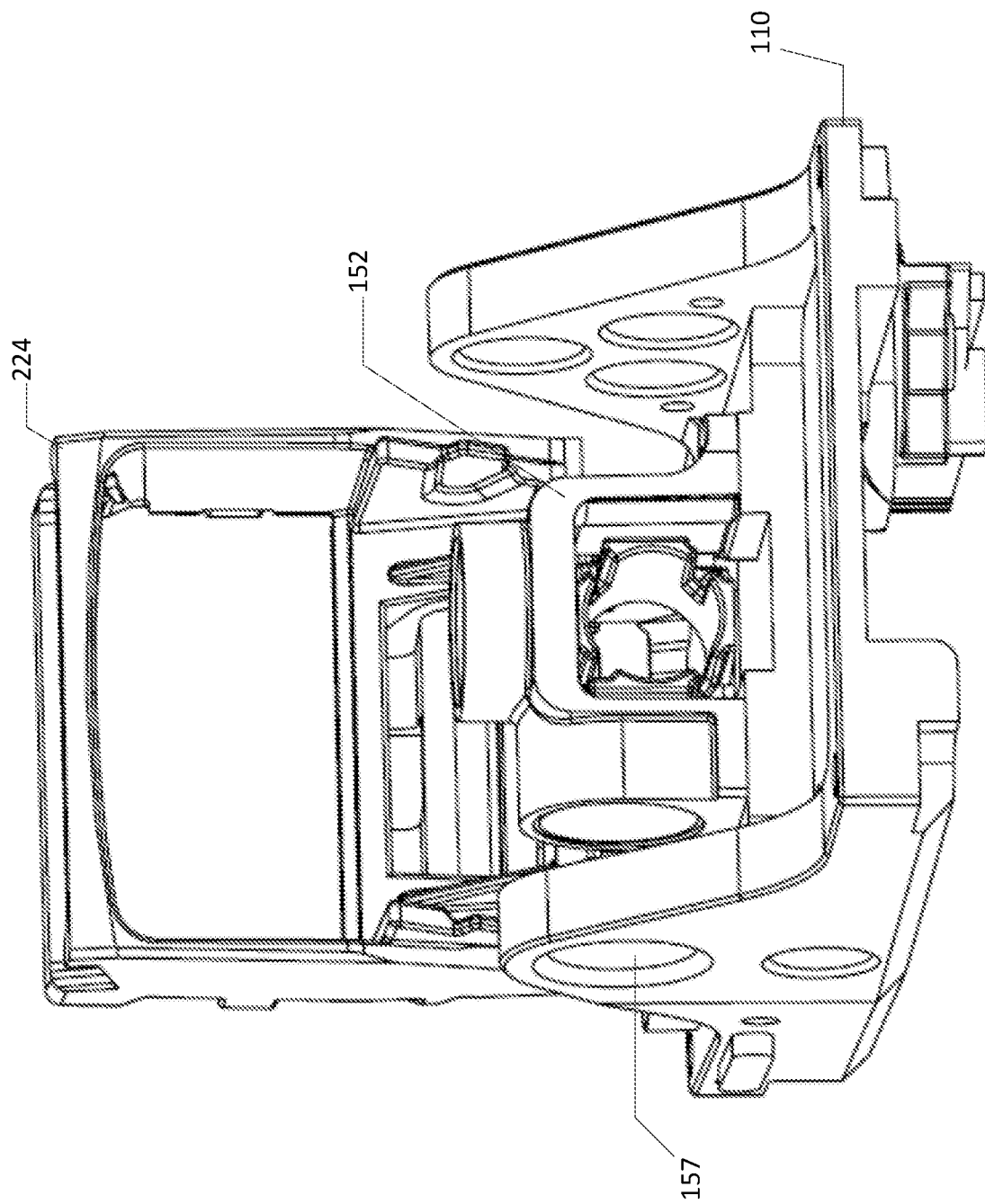
FIG. 5 is a perspective view of an example optical chassis attached to an example base.

FIG. 4A depicts an isolated perspective view of an example optical chassis 132 attached to the base 110 and with the optical components removed. FIG. 4B depicts an enlarged view of a portion of the example optical chassis 132. FIG. 5 depicts a reverse perspective view of the optical chassis 132 attached to the base 110. The optical chassis 132 may comprise an attachment flange 220, a support member 222 integrally formed with the attachment flange 220 and extending upward from the attachment flange 220, and a unitary optical component carrier 224 integrally formed with the support member 222. The attachment flange 220 may be secured to the base 110 using a suitable manner which may comprise, for example, screws that extend through openings in the attachment flange 220 and into corresponding receptacles in the base 110. The support member 222 and the unitary optical component carrier 224 may be suspended relative to the base 110 by the attachment flange 220.

The support member 222 of the optical chassis 132 may comprise one or more portions that are flexible such that the unitary optical component carrier 224 may be angularly moveable in horizontal and/or vertical directions relative to the attachment flange 220 and the base 110. The support member 222 may be compliant so as to allow for adjustment of the position of the unitary optical component carrier 224 relative to the attachment flange 220 and base 110 and thereby allow for adjusting the location of the hologram created in the operator's field of view.

The support member 222 may comprise a first wall 240 extending upward relative to the attachment flange 220 and integrally formed with the attachment flange 220. The support member 222 may further comprise a second wall 244 and a flexible member 246 coupled between the first wall 240 and the second wall 244. The second wall 244 and the flexible member 246 may be supported by the first wall 240. The second wall 244 may be free to angularly move horizontally, with the flexible member 246 as a fulcrum, relative to the attachment flange 220 and base 110. The flexible member 246 may be coupled to the first wall 240 near the center of the first wall 240 and may be coupled to the second wall 244 near the center of the second wall 244. When a horizontal force is applied to the second wall 244, the flexible member 246 may be flexed or twisted allowing the second wall 244 to move or be angularly displaced horizontally relative to the first wall 240 with the flexible member 246 being a fulcrum of the movement. Horizontal force applied to the optical component carrier 224 may be communicated to the second wall 244 and may result in angular horizontal movement around or about the flexible member 246 of second wall 244 and the optical component carrier 224 relative to the first wall 240 and the attachment flange 220.

The support member 222 may further comprise a first horizontal member 247 integrally formed with the second wall 244 and extending away from the unitary optical component carrier 224, a second horizontal member 248 extending toward the unitary optical component carrier 224, and a joint member 249 integrally formed with the first horizontal member 247 and the second horizontal member 248. The first horizontal member 247, the joint member 249, and the second horizontal member 248 may be integrally formed and together provide vertical flexibility to the unitary optical component carrier 224 relative to the attachment flange 220 and the base 110. The second horizontal member 248 may be flexible in a vertical direction relative to the first horizontal member 247. The joint member 249 may be flexible and allow for vertical movement of the second horizontal member 248 relative to the first horizontal member 246. When vertical pressure is applied to the second horizontal member 248, it may move or be displaced in a vertical direction relative to the first horizontal member 247, the attachment flange 220, and the base 110. The movement may be angular with the joint member 249 serving as a fulcrum. Vertical force applied to the unitary optical component carrier 224 may be communicated to the second horizontal member 248 and result in vertical angular movement or displacement around or about the joint member 249 of the unitary optical component carrier 224 and the second horizontal member 248 relative to the first horizontal member 247 and the attachment flange 220. As illustrated in the FIGs, multiple instances of the first horizontal member 247 and the second horizontal member 248 may be comprised in the support member 222.

Figure 6:
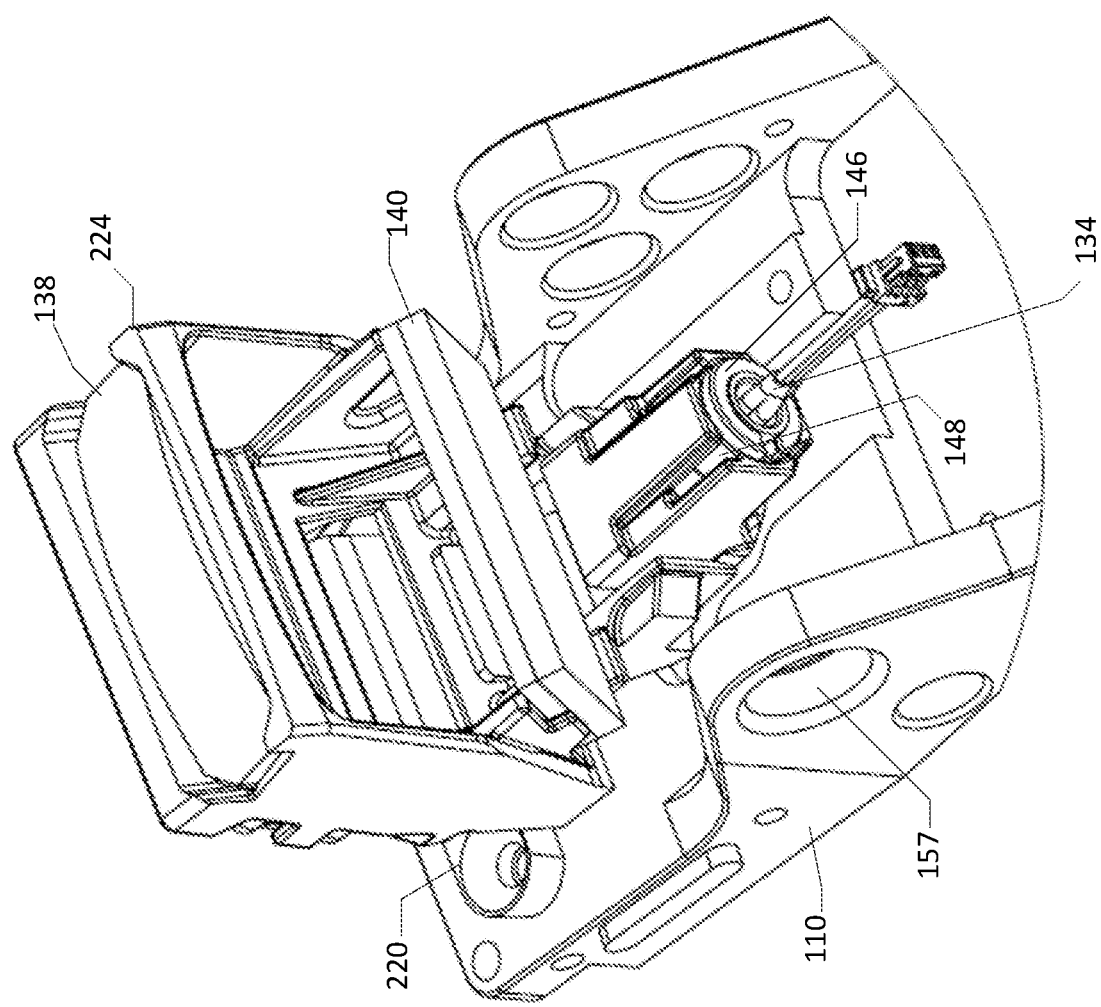
FIG. 6 is a perspective view of an example optical chassis attached to an example base and with optical components attached.
Figure 7:
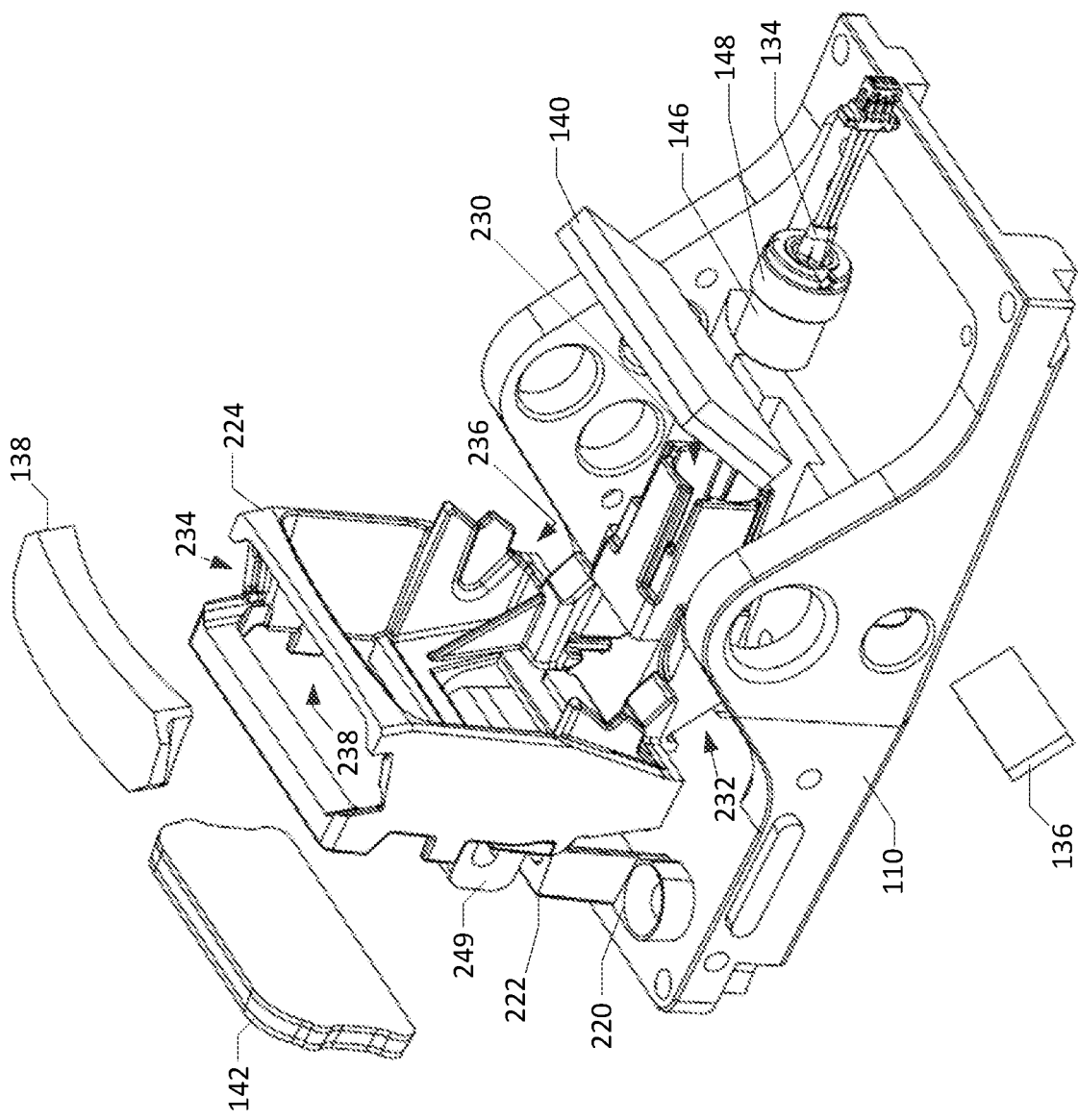
FIG. 7 is a perspective view of an example optical chassis attached to an example base and with optical components exploded.
Figure 8:
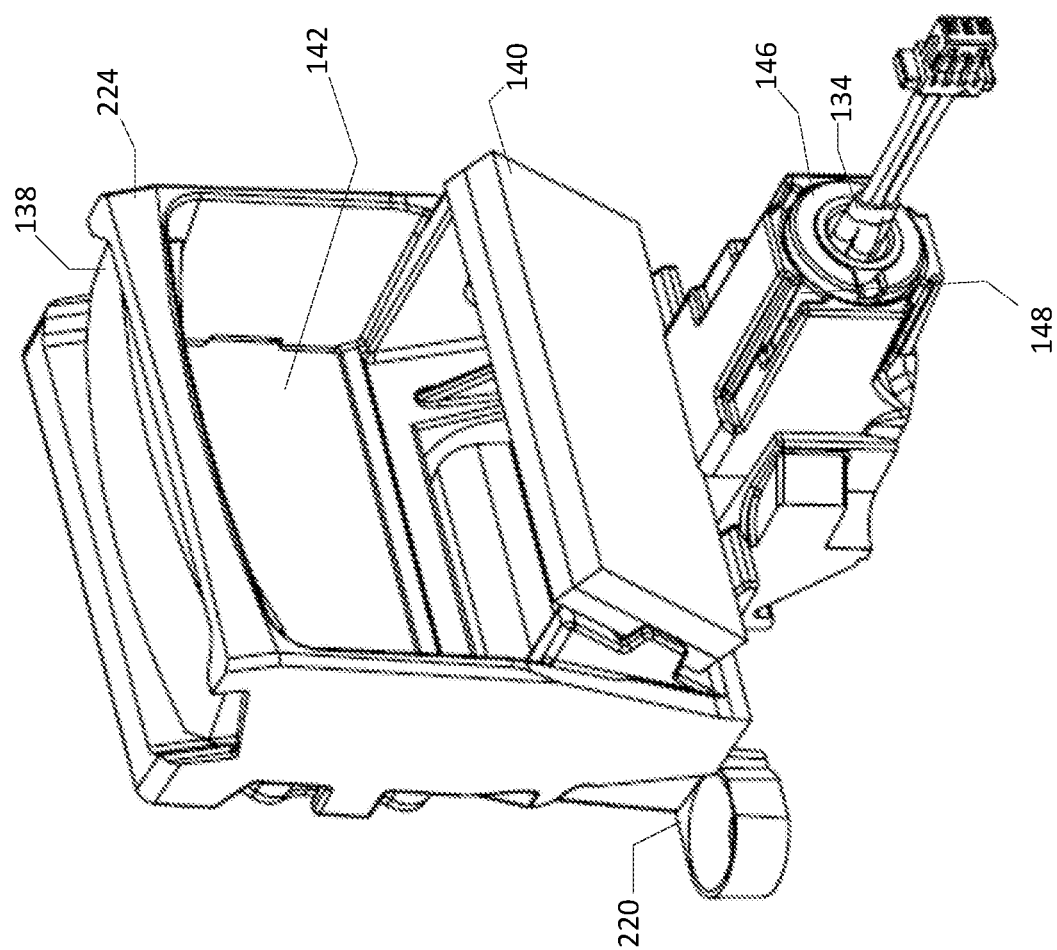
FIG. 8 is a perspective view of an example optical chassis with optical components attached.
Figure 9:
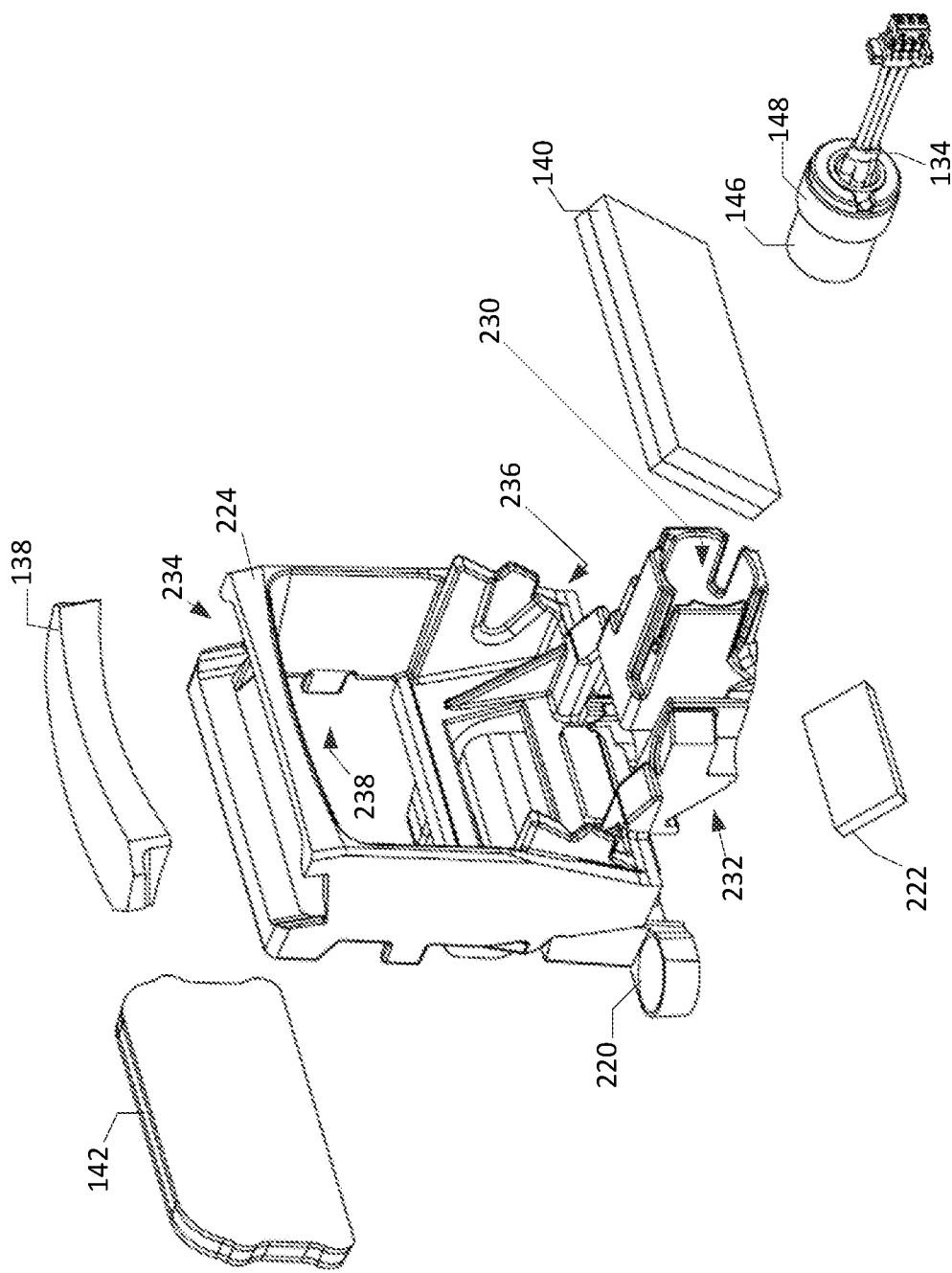
FIG. 9 is a perspective view of an example optical chassis with optical components exploded.

FIG. 6 depicts a perspective view of the example unitary optical component carrier 224 coupled via attachment flange 220 to the base 110 and with the optical components 134, 136, 138, 140, and 142 attached. FIG. 7 depicts the example unitary optical component carrier 224 with optical components 134, 136, 138, 140, and 142 exploded. FIG. 8 depicts a perspective view of the example unitary optical component carrier with optical components attached and without the base 110. FIG. 9 depicts the example optical component carrier without the base 110 and with the optical components 134, 136, 138, 140, and 142 exploded. The unitary optical component carrier 224 comprises a body that may serve as a bench or rack to which the optical components are attached. The unitary optical component carrier 224 may be integrally formed with the support member 222 which may be integrally formed with the attachment flange 220. The unitary optical component carrier 224 may comprise a rigid body and may be substantially resistant to changes in relative distances between the optical components. For example, in a scenario wherein forces are applied to the first receptacle 230 by elevation adjuster assembly 154 and/or by the azimuth adjuster assembly 156, the unitary optical component carrier 224 may be resistant to distortion and may move substantially in unison with the relative distances between the optical components 134, 136, 138, 140, and 142 remaining substantially unchanged. The unitary optical component carrier 224 may be made from a material that has a relatively low coefficient of thermal expansion. As a result, the relative distance between the optical components may remain substantially the same over a wide spectrum of temperature environments. In an example, unitary optical component carrier 224 may be manufactured from titanium.

The unitary optical component carrier 224 may comprise a plurality of receptacles 230, 232, 234, 236, 238 configured to receive optical components. Each of the receptacles 230, 232, 234, 236, and 238 may comprise one or more surfaces configured to receive or abut corresponding surfaces of the appropriate optical components. For example, the receptacle 230 may receive and form a frictional fit with the ring 148, which holds therein the collar 146 and the laser diode 134 positioned in the collar 146. The receptacle 232 may receive and abut one or more surfaces of the mirror 222. The receptacle 234 may receive and abut one or more surfaces of the collimating optic 138. The receptacle 236 may receive and abut one or more surfaces of the holographic grating 140. The receptacle 238 may receive and abut one or more surfaces of the image hologram 142. The surface to surface mounting results in precise locating of the optical components relative to the unitary optical component carrier 224 and to each other. The receptacles 230, 232, 234, 236, and 238 are configured to allow the corresponding optical components to be applied from the exterior of the unitary optical component carrier 224. Mounting of the optical components from the exterior may be performed by an automated means such as, for example, by robotic handling. The optical components may be secured in the receptacles 230, 232, 234, 236, and 238 via friction between the optical components and the corresponding receptacle and/or by application of an adhesive.

Figure 10:
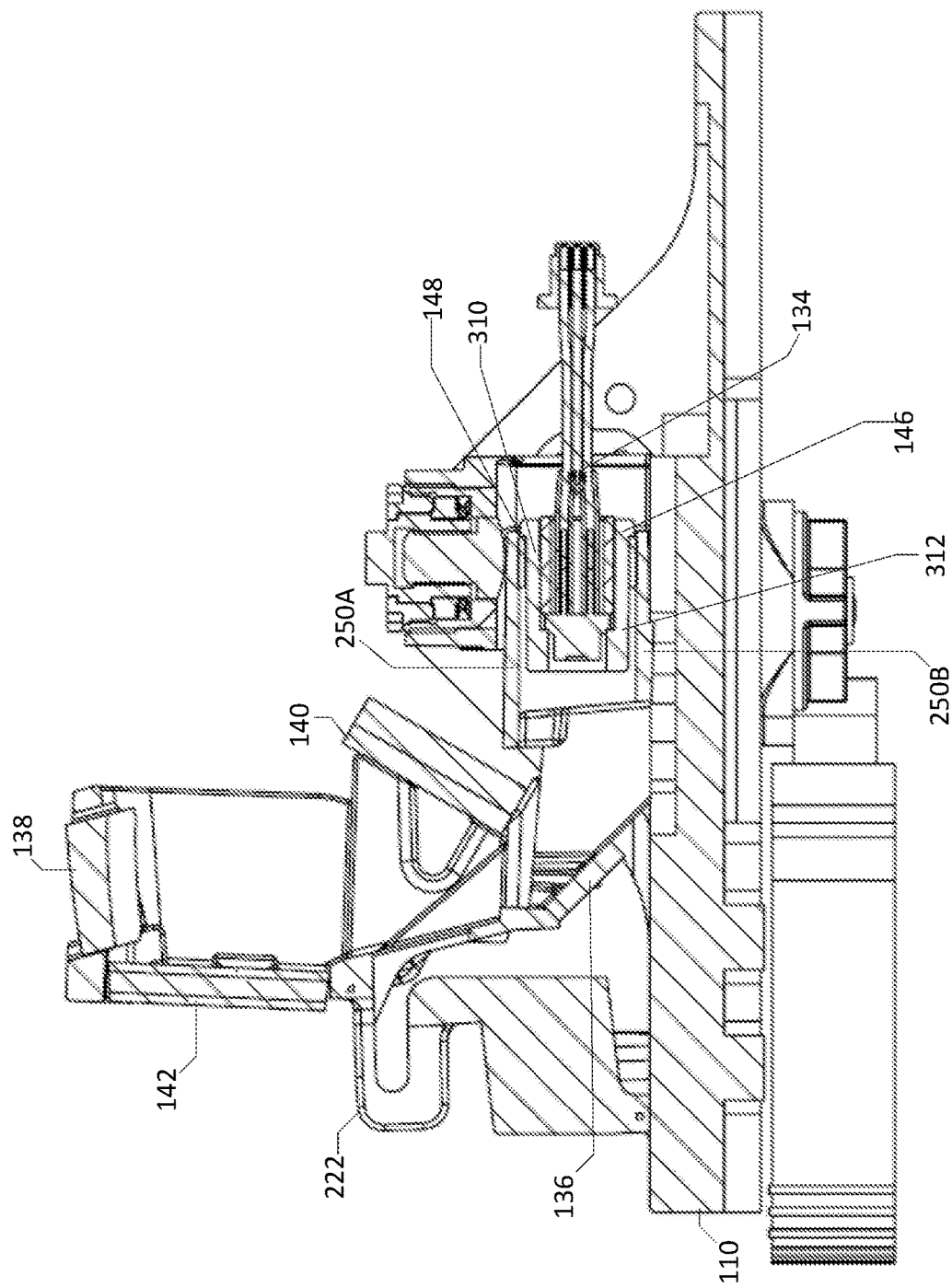
FIG. 10 is a section view of an example optical chassis attached to an example base and with optical components attached.
Figure 11:
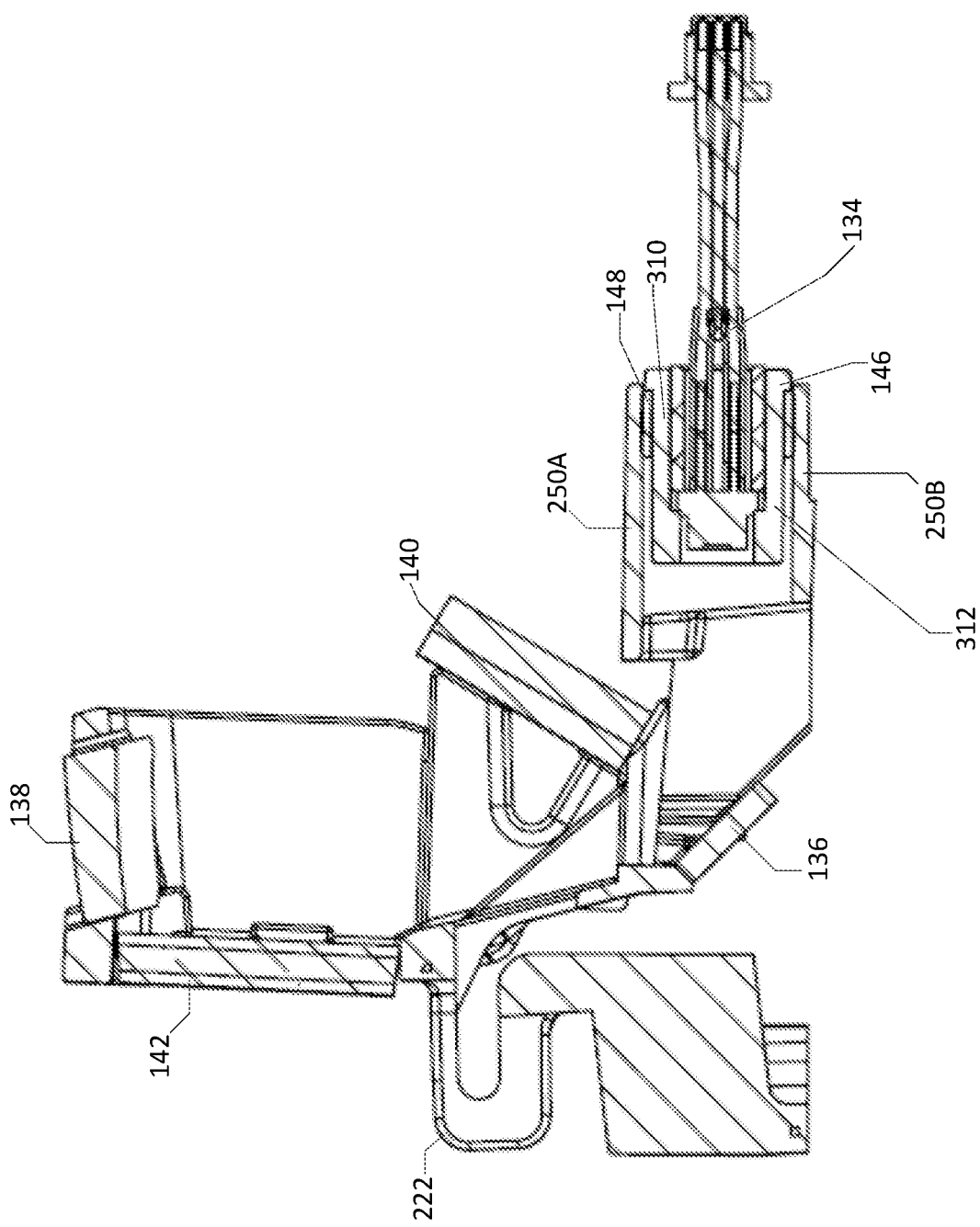
FIG. 11 is a section view of an example optical chassis with optical components attached.

FIG. 10 depicts a side cross sectional view of the base 110 and the attached optical chassis 132 with the optical components 134, 136, 138, 140, and 142 positioned in the corresponding receptacles 230, 232, 234, 236, and 238. FIG. 11 depicts a cross sectional view of the optical chassis 132 without the base 110. The laser diode 134 may be configured to generate and emit a visible light beam which is directed toward and received at the mirror 136. The mirror 136 may be positioned opposite the laser diode and configured to receive and reflect or redirect the visible light beam received from the laser diode 134 toward the collimating optic 138. The collimating optic 138 may be positioned and configured to receive the reflected or redirected light beam from the mirror 136, collimate the redirected visible light beam, and direct a collimated visible light beam to the grating 140. The grating 140 may be positioned and configured to receive the collimated light beam, diffract the collimated visible light beam, and direct the diffracted collimated visible light beam toward the image hologram 142. The image hologram 142 may be positioned and configured to receive diffracted collimated visible light beam from the grating 140 and project a hologram which may be viewed in the viewing area of the holographic sight 100. The laser diode 134, the mirror 136, and the collimating optic 138 may be positioned relative to each other to create an optical path for the light emitted from the laser diode 134 to the mirror 136, and from the mirror 134 to the collimating optic 138. The optical path may continue from the collimating optic 138 to the grating 140, and from the grating 140 to the image hologram 142.

The laser diode 134 may be positioned within the collar 146, and the collar 146 may be positioned within the ring 148. The ring 148, collar 146, and laser diode 134 may be positioned within the first receptacle 230 of the unitary optical component carrier 224. The first receptacle 230 may form an opening or receptacle established by two sets of opposing sidewalls 250A, B and 252A,B. The ring 148 may abut and form a frictional fit with two sets of opposing sidewalls 250A, B and 252 A, B. In other words, the ring 148 may be secured to the inner surface of the first receptacle 230 by friction between the ring 148 and the surface of the first receptacle 230. A first portion 310 of the collar 146 corresponding to the ring 148 may be substantially fixed relative to the first receptacle 230 and the unitary optical component carrier 224. The first portion 310 of the collar 146 may move substantially with the first receptacle 230 as it expands and contracts. A second portion 312 of the collar 146 not corresponding to the ring 148 may be suspended within the first receptacle 230 and may be free to move relative to the first receptacle 230. For example, as the collar 146 expands and/or contracts in response to changes in temperatures, the position of the second portion 312 of the collar 146 may change relative to the first receptacle 230. The laser diode 134 may be affixed to the collar 146 proximate the second portion 312 and, therefore, may be free to move relative to the first receptacle 230 as the second portion 312 expands and/or contracts in response to changes in temperature.

The laser diode 134, the mirror 136, and the collimating optic 138 may be positioned relative to each other to create an optical path from the laser diode 134 to the mirror 136, and from the mirror 136 to the collimating optic 138. The collar 146 may expand and/or contract in response to changes in temperature to compensate for the unitary optical component carrier 224 expanding and/or contracting in response to changes in temperature. For example, in a scenario the unitary optical component carrier 224 expands in response to an increase in temperature, the first portion 310 of the collar 146 which is frictionally coupled with the first receptacle 230 of the unitary optical component carrier 224 may move away from the mirror 136 with the first receptacle 230 as the first receptacle 230 expands. The collar 146 may expand in response to the increase in temperature which causes the second portion 312 of the collar 146 and the laser diode 134 affixed thereto to move toward the mirror 136. The expansion of the collar 146 and the corresponding movement of the laser diode 134 toward the mirror 136 counteracts or compensates for the expansion of the unitary optical component carrier 224 and the corresponding movement of the first portion 310 of the collar 146 away from the mirror 136. The length of the optical path from the laser diode, to the mirror, and from the mirror to the collimating optic remains substantially constant or unchanged in response to the change in temperature. Likewise, the optical path from the laser diode 134 to the mirror 232, from the mirror 232 to the collimating optic 138, from the collimating optic 138 to the grating 140, and from the grating 140 to the image hologram 142 also remains substantially constant or unchanged in response to the change in temperature.

In a scenario the unitary optical component carrier 224 contracts in response to a decrease in temperature, the first portion 310 of the collar 146 which is frictionally coupled with the first receptacle 230 of the unitary optical component carrier 224 may move toward the mirror 136 with the first receptacle 230 as the first receptacle contracts. The collar 146 may contract in response to the decrease in temperature which causes the second portion 312 of the collar 146 and the laser diode 134 affixed thereto to move away from the mirror 136. The contraction of the collar 146 and the corresponding movement of the laser diode 134 away from the mirror 136 counteracts or compensates for the contraction of the unitary optical component carrier 224 and the corresponding movement of the first portion 310 of the collar 146 toward the mirror 136. The length of the optical path from the laser diode 134 to the mirror 136, and from the mirror 136 to the collimating optic 138 remains substantially unchanged or constant in response to changes in temperature. Likewise, the optical path from the laser diode 134 to the mirror 232, from the mirror 232 to the collimating optic 138, from the collimating optic 138 to the grating 140, and from the grating 140 to the image hologram 142 also remains substantially constant or unchanged in response to the change in temperature.

The unitary optical component carrier 224 may have a first coefficient of thermal expansion and the collar 146 may have a second coefficient of thermal expansion. The first coefficient of thermal expansion and the second coefficient of thermal expansion may be different and the length of the collar 146 may be sized so that the length of the optical path remains substantially constant in response to changes in temperature. For example, the unitary optical component carrier 224 may be formed from titanium and the laser diode she 146 may be formed from acrylonitrile butadiene styrene. The ring 148 may be formed from steel such as, for example, stainless steel.

Accordingly, Applicant has disclosed a holographic sight wherein the relative positions of the optical components remain substantially unchanged in response to changes in temperature. Expansion and contraction of the unitary optical component carrier is compensated for by expansion and contraction of the collar in which the laser diode is seated. The length of the optical path between the laser diode and the other optical components remains unchanged in response to changes in temperatures. The holographic sight is stable across temperatures.

It will be appreciated that while illustrative embodiments have been disclosed, the scope of potential embodiments is not limited to those explicitly described. For example, while an example holographic sight is described with a particular number of optical components, different numbers of optical components may be comprised in a holographic sight consistent with the disclosure. Embodiments may have optical components arranged in formations other than as in the examples described herein. Likewise, embodiments may employ support members that provide similar functionality, but which are configured differently than as explicitly described herein.

Although the features and elements may be described herein in particular combinations, each feature or element may be used alone, without the other features and elements, and/or in various combinations with or without other features and elements.

What is claimed:

1. A holographic sight comprising:
    a unitary optical component carrier, the optical component carrier comprising a plurality of receptacles configured to receive optical components;
    a collimating optic abutting a surface of a first receptacle of the plurality of receptacles; a mirror abutting a surface of a second receptacle of the plurality of receptacles;
    a collar positioned in a third receptacle of the plurality of receptacles;
    a ring positioned around the collar; and
    a laser diode positioned within the collar within the third receptacle, the mirror positioned opposite the laser diode, a first portion of the collar affixed relative to a first portion of the third receptacle and a second portion of the collar free to expand and contract relative to the third receptacle, the laser diode affixed to the collar proximate the second portion and free to move relative to the third receptacle with expansion and contraction of the second portion,
    wherein the laser diode, the mirror, and collimating optic are positioned relative to each other to create an optical path from the laser diode to the mirror, and from the mirror to the collimating optic,
    wherein a length of the optical path remains substantially constant in response to changes in temperature, the collar expanding and contracting in response to changes in temperature to compensate for the unitary optical component carrier expanding and contracting in response to changes in temperature.

2. The holographic sight of claim 1,
wherein the unitary optical component carrier expands in response to an increase in temperature, causing the first receptacle to move away from the mirror, and
wherein the collar expands in response to an increase in temperature, causing the second portion of the collar and the laser diode to move toward the mirror.

3. The holographic sight of claim 1,
wherein the unitary optical component carrier contracts in response to a decrease in temperature, causing the first receptacle to move toward the mirror, and
wherein the collar contracts in response to a decrease in temperature, causing the second portion of the collar and the laser diode to move away from the mirror.

4. The holographic sight of claim 1, wherein the ring is abutting the third receptacle.

5. The holographic sight of claim 4, wherein the third receptacle comprises an aperture, the ring abutting a surface of the aperture.

6. The holographic sight of claim 5, wherein the ring is secured relative to the surface of the aperture by friction between the ring and the surface of the aperture.

7. The holographic sight of claim 6, wherein the unitary optical component carrier is fabricated from titanium and the collar is fabricated from acrylonitrile butadiene styrene.

8. The holographic sight of claim 7, wherein the ring is fabricated from stainless steel.

9. The holographic sight of claim 1,
wherein the unitary optical component carrier has a first coefficient of thermal expansion and the collar has a second coefficient of thermal expansion,
wherein the collar expands and contracts during changes in temperature so that the length of the optical path remains substantially constant during changes in temperature.

10. The holographic sight of claim 1, further comprising:
a holographic grating abutting a surface of the fourth receptacle; and an image hologram abutting a surface of the fifth receptacle.

11. A holographic sight comprising:
a unitary optical component carrier, the optical component carrier comprising a plurality of receptacles configured to receive optical components;
an image hologram abutting a surface of a first receptacle of the plurality of receptacles;
a collar positioned in a second receptacle of the plurality of receptacles;
a ring positioned around the collar; and
a laser diode positioned within the collar within the second receptacle, a first portion of the collar affixed relative to a first portion of the second receptacle and a second portion of the collar free to expand and contract relative to the second receptacle, the laser diode affixed to the collar proximate the second portion and free to move relative to the second receptacle with expansion and contraction of the second portion,
wherein the laser diode and image hologram are positioned relative to each other to create an optical path from the laser diode to the collimating optic,
wherein a length of the optical path remains substantially constant in response to changes in temperature, the collar expanding and contracting in response to changes in temperature to compensate for the unitary optical component carrier expanding and contracting in response to changes in temperature.

12. The holographic sight of claim 11,
wherein the unitary optical component carrier expands in response to an increase in temperature, and
wherein the collar expands in response to an increase in temperature, causing the second portion of the collar and the laser diode to move in a direction counteracting expansion of the unitary optical component carrier and substantially maintaining the length of the optical path.

13. The holographic sight of claim 11,
wherein the unitary optical component carrier contracts in response to a decrease in temperature, and wherein the collar contracts in response to a decrease in temperature, causing the second portion of the collar and the laser diode to move in a direction counteracting contraction of the unitary optical component carrier and substantially maintaining the length of the optical path.

14. The holographic sight of claim 11,
wherein the unitary optical component carrier has a first coefficient of thermal expansion and the collar has a second coefficient of thermal expansion,
wherein the collar expands and contracts during changes in temperature so that the length of the optical path remains substantially constant during changes in temperature.

15. The holographic sight of claim 11, further comprising:
a mirror abutting a surface of a third receptacle of the plurality of receptacles;
a collimating optic abutting a surface of a fourth receptacle of the plurality of receptacles; and a grating abutting a surface of a fifth receptacle of the plurality of receptacles;
wherein the optical path from the laser diode to the image hologram comprises a path from the laser diode to the mirror, a path from the mirror to the collimating optic, a path from the collimating optic to the grating, and a path from the grating to the image hologram.

16. A holographic sight comprising:
a unitary optical component carrier, the optical component carrier comprising a first receptacle configured to receive a laser diode, a second receptacle configured to receive a mirror, a third receptacle configured to receive a collimating optic, a fourth receptacle configured to receive a holographic grating, and a fifth receptacle configured to receive an image hologram;
a mirror abutting a surface of the second receptacle;
a collimating optic abutting a surface of the third receptacle;
a grating abutting a surface of the fourth receptacle;
an image hologram abutting a surface of the fifth receptacle;
a collar positioned within the first receptacle;
a ring positioned around the collar; and
a laser diode, the laser diode positioned within the collar,
wherein the mirror is positioned opposite the first receptacle and the laser diode,
wherein a first portion of the collar is affixed relative to a first portion of the first receptacle and a second portion of the collar is free to expand and contract relative to the first receptacle, the laser diode affixed to the collar proximate the second portion,
wherein expansion of the unitary optical component carrier due to an increase in temperature causes the first portion of the first receptacle to move away from the mirror and expansion of the collar due to the increase in temperature causes the second portion of the collar and the laser diode to move toward the mirror.

17. The holographic sight of claim 16,
wherein movement of the first portion of the first receptacle away from the mirror is offset by movement of the second portion of the collar and the laser diode toward the mirror.

18. The holographic sight of claim 16,
wherein the unitary optical component carrier has a first coefficient of thermal expansion (CTE) and the collar has a second CTE, the first CTE and the second CTE related in size such that expansion of the first receptacle away from the mirror due to increased temperature is offset by an expansion of the collar and movement of the second portion of collar toward the mirror.

19. The holographic sight of claim 16, wherein the ring is abutting the first receptacle.

20. The holographic sight of claim 19,
wherein the first receptacle comprises an aperture, the ring abutting a surface of the aperture and secured relative to the surface of the aperture by friction between the ring and the surface of the aperture.

* * * * *